No. 867,640. PATENTED OCT. 8, 1907.
P. BURNAH.
ELEVATING DEVICE.
APPLICATION FILED JUNE 20, 1907.
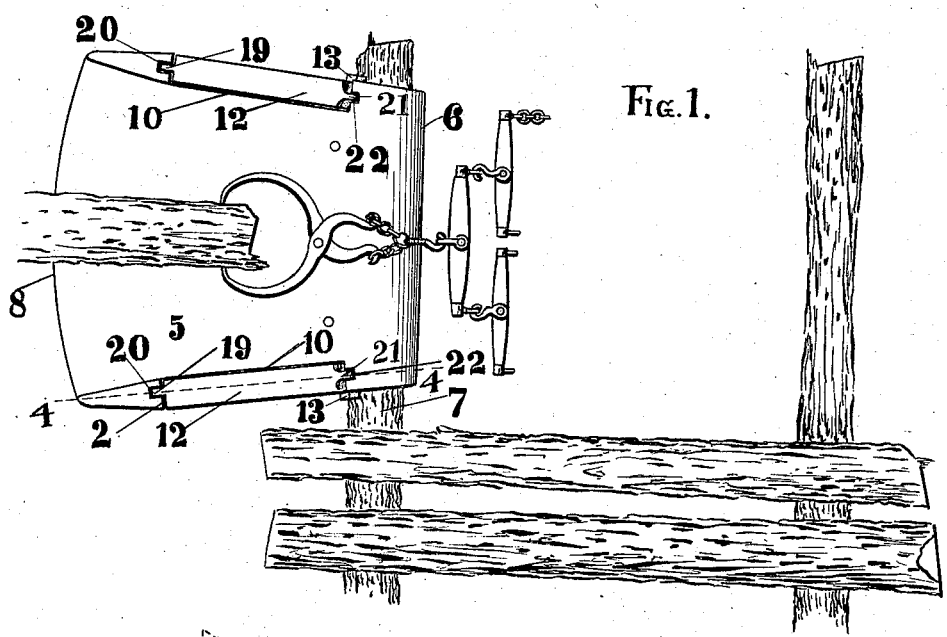
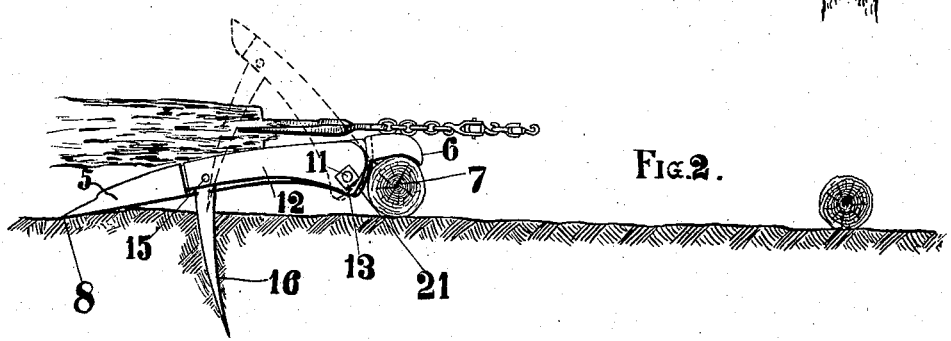
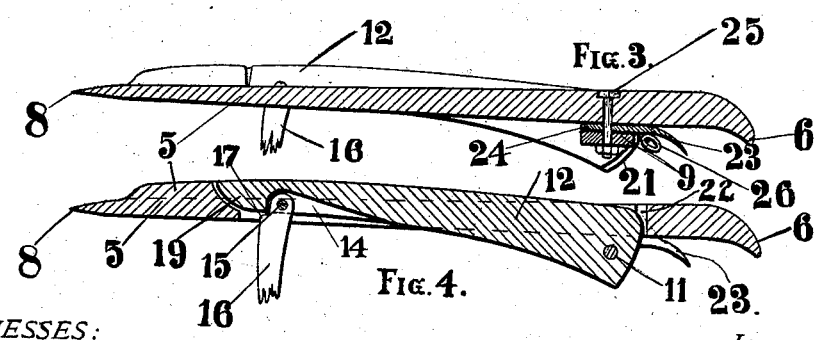
WITNESSES:
INVENTOR
Paul Burnah.
BY
Attorneys

UNITED STATES PATENT OFFICE.

PAUL BURNAH, OF CLAYBURG, NEW YORK.

ELEVATING DEVICE.

No. 867,640.  Specification of Letters Patent.  Patented Oct. 8, 1907.

Application filed June 20, 1907. Serial No. 379,997.

*To all whom it may concern:*

Be it known that I, PAUL BURNAH, a citizen of the United States, residing at Clayburg, in the county of Clinton and State of New York, have invented certain new and useful Improvements in Elevating Devices, of which the following is a specification.

This invention is a device for elevating timber, and more particularly one to be used in connection with a skidway for elevating logs whereby they can be more easily and rapidly loaded.

In the accompanying drawings, Figure 1 is a plan view of the invention, showing the application thereof. Fig. 2 is an edge view. Fig. 3 is a longitudinal section. Fig. 4 is a longitudinal section on the line 4—4 of Fig. 1.

Referring specifically to the drawings, 5 denotes a flat plate which is turned down at one end to form a hook 6 which engages over one of the logs 7 of a skidway on which the timber is to be loaded. The other end of the plate rests on the ground so that an inclined plane is had. This end of the plate is beveled to a sharp point 8 in order that it may come close to the ground and thus offer no obstruction to the logs as they are dragged up the plate.

To the bottom of the plate is secured a cross-bar 9, and in opposite side edges of the plate are recesses 10. On the ends of the cross-bar are spindles 11 on which are pivotally mounted levers 12 which fit in the recesses and are secured to the spindles by nuts 13 screwed on the threaded projecting ends thereof. At the free ends of the levers, in the under side thereof, are recesses 14 in which are pivoted on a cross-pin 15 extending through the recess, stakes 16 which taper to a sharp point and are adapted to be driven into the ground to anchor the device. Near their pivoted ends, the stakes are reduced in width to form shoulders 17 which are engageable with the levers 12 to limit the outward swing of the stakes. At the free ends of the levers 12 are short projections 19 which are adapted to enter notches 20 in the walls of the recesses 10 at one end thereof, and at their opposite end, the levers have guide ribs 21 which work in grooves 22 made in the adjacent walls of the recesses.

To the cross bar 9 are secured teeth 23 which are presented toward the hook 6. The shanks 24 of the teeth are held between the cross bar and the bottom of the plate 5, the cross bar being recessed to receive the shanks. The bolts 25 which fasten the cross bar to the plate also pass through the shanks of the teeth whereby they are securely fastened. The cross bar also carries a ring 26 for attaching a draft device when the plate is to be hauled from one skidway to another.

In use, the plate 5 is placed on one of the logs 7 of the skidway, as described. The levers 12 are swung upwardly so that the stakes 16 will be downwardly presented as shown by dotted lines in Fig. 2. The stakes are then driven into the ground by striking the levers and forcing them downwardly until stopped by the projections 19 entering the notches 20. The levers are now in the recesses 10 and offer no obstruction to the log traveling up the plate. The pivotal connection between the stakes and the levers enables the stakes to be set so as to avoid stones, and the parts also act as a sort of a toggle by reason of which, when the stakes are driven into the ground, the plate will be pushed forwardly toward the log 7 which drives the teeth 23 thereinto. The plate therefore will be securely held in position on the log. The timber to be loaded on the skidway is attached to the team and is elevated onto the skidway by being dragged up the plate 5. It is therefore not necessary to lift the timber and it can be rapidly and easily loaded on the skidway. When the device is to be hauled from one skidway to another the plate 5 is inverted, and a team is hitched to the ring 26.

I claim:

1. An elevating device comprising an inclined plate, and anchoring means for the plate comprising levers pivoted thereto, and stakes pivoted to the levers, and adapted to be driven into the ground.

2. An elevating device comprising an inclined plate having teeth engageable with a support, levers pivoted to the plate, and stakes pivoted to the free ends of the levers and adapted to be driven into the ground.

In testimony whereof I affix my signature, in presence of two witnesses.

PAUL BURNAH.

Witnesses:
FRANK A. DUPRAW,
CHARLES H. DUPRAW.